(12) United States Patent
Reid et al.

(10) Patent No.: US 7,147,088 B2
(45) Date of Patent: Dec. 12, 2006

(54) SINGLE-SIDED CRASH CUSHION SYSTEM

(76) Inventors: John D. Reid, 5931 The Knolls, Lincoln, NE (US) 68512; John R. Rohde, 2620 Woodleigh La., Lincoln, NE (US) 68502; Dean L. Sicking, 2309 Huldy St., Houston, TX (US) 77019

( * ) Notice: Subject to any disclaimer, the term of this patent is extended or adjusted under 35 U.S.C. 154(b) by 0 days.

(21) Appl. No.: 11/158,984

(22) Filed: Jun. 23, 2005

(65) Prior Publication Data

US 2005/0252742 A1 Nov. 17, 2005

Related U.S. Application Data

(63) Continuation of application No. 10/262,366, filed on Oct. 1, 2002.

(51) Int. Cl.
*F16F 7/12* (2006.01)

(52) U.S. Cl. .................. 188/377; 188/374; 293/133

(58) Field of Classification Search ............... 293/133; 74/492; 188/371, 374, 376, 377
See application file for complete search history.

(56) References Cited

U.S. PATENT DOCUMENTS

| | | | |
|---|---|---|---|
| 3,143,321 A | 8/1964 | McGehee et al. | |
| 3,608,677 A | 9/1971 | Wykes | |
| 3,744,338 A | 7/1973 | Komatsu et al. | |
| 3,916,720 A | 11/1975 | Smith | |
| 4,190,276 A * | 2/1980 | Hirano et al. | 293/133 |
| 4,200,310 A | 4/1980 | Carney | |
| 4,336,868 A | 6/1982 | Wilson et al. | |
| 4,655,434 A * | 4/1987 | Bronstad | 256/13.1 |
| 4,838,523 A * | 6/1989 | Humble et al. | 256/13.1 |
| 5,181,589 A | 1/1993 | Siegner et al. | |
| 5,351,791 A | 10/1994 | Rosenzweig | |
| 5,391,016 A * | 2/1995 | Ivey et al. | 404/6 |
| 5,732,801 A | 3/1998 | Gertz | |
| 5,875,875 A * | 3/1999 | Knotts | 188/374 |
| 5,957,435 A * | 9/1999 | Bronstad | 256/13.1 |
| 6,902,150 B1 * | 6/2005 | Alberson et al. | 256/13.1 |
| 2001/0013596 A1 * | 8/2001 | Sicking et al. | 256/13.1 |

* cited by examiner

*Primary Examiner*—Devon Kramer
(74) *Attorney, Agent, or Firm*—Jackson Walker, LLP (57) ABSTRACT

A single-sided crash attenuation cushion system having an impact head and three stage energy absorption mechanism. The energy absorbing mechanism has a mandrel for deforming thin-walled tubes in a controlled collapse to absorb impact forces from a colliding vehicle. The third stage of the absorption mechanism includes an additional deformable compressible tube between the fixed-object hazard and the thin walled tubes.

5 Claims, 11 Drawing Sheets

SINGLE-SIDED CRASH CUSHION SYSTEM

This is a continuation application based upon co-pending U.S. patent application Ser. No. 10/262,366, filed Oct. 1, 2002.

This invention was made in part during work supported by a grant/contract Contract No. DTR557-98-C from DOT/RSPA/Volpe National Transportation System Center. The government may have certain rights in this invention.

BACKGROUND OF THE INVENTION

The present invention relates to a traffic crash attenuation system. More particularly, the present invention relates to a system, method and apparatus for absorbing the kinetic energy from an impacting vehicle in a controlled and safe manner with roadside safety devices such as: guardrails and median barrier end treatments, crash cushions, and truck mounted attenuators. The system provides for the controlled rupturing of a tubular member by a mandrel whereby forces of an impacting vehicle are absorbed. The present inventive system may utilize a rectangular mandrel and a corresponding rectangular tubular member.

U.S. Pat. No. 4,200,310 illustrates an energy absorbing system which utilizes a number of cylindrical energy absorbing members placed in a series-type relationship on a frame mounted to a truck. The system is provided with an alignment or guidance frame. However, there is nothing which teaches any selectively controlling the rupture of the cylindrical members via a single sided-crash cushion The mechanism of energy dissipation is significantly different than that of the present invention.

U.S. Pat. No. 3,143,321, teaches the use of a frangible tube for energy dissipation. As with the present invention, the apparatus disclosed in U.S. Pat. No. 3,143,321 uses a mandrel receivable within a tubular member. However, there is no teaching of a means for selectively controlling the rupturing along a length of the tubular member.

DETAILED DESCRIPTION OF THE PREFERRED EMBODIMENT

Figure 1A:
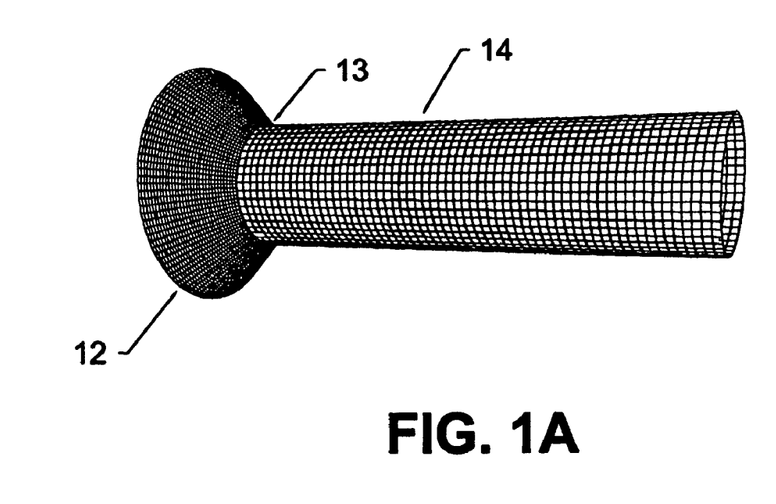
FIG. 1A is an isometric view of a mandrel and tubular member for use in of the present invention before impact forces are applied.
Figure 1B:
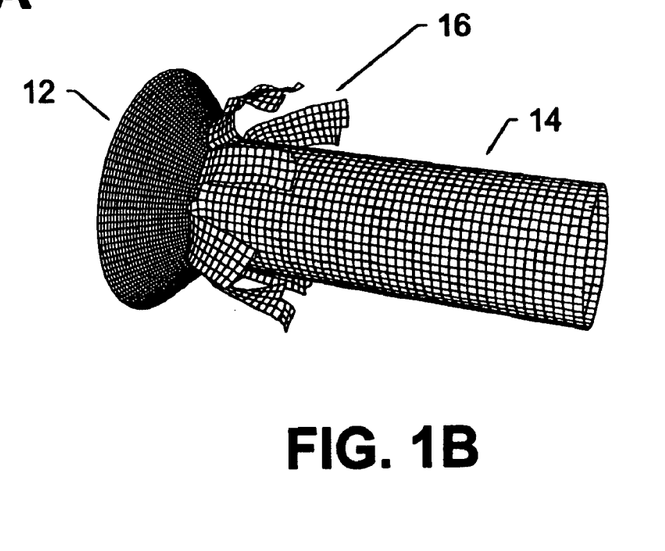
FIG. 1B illustrates the rupturing of the tubular member by the mandrel upon impact.

A controlled fracture or rupturing mechanism which may be used with the single-sided crash attenuation cushion system of the present invention is based on the concept that, when an over-sized plunger with a tapered surface (mandrel 12) is forced into a thin-wall tubing 14 of the generally same shape, pressure is exerted on the edge of the tubing from the inside, as illustrated in FIGS. 1A and 1B. The pressure initially expands the size of the thin-wall tubing, first elastically until the yielding strength of the metal is reached and then plastically. The tubing eventually fractures or ruptures 16 at the edge when the ultimate tensile capacity of the material is exceeded. This process of expanding and fracturing the thin-wall tubing 14 is repeated and energy dissipated as the mandrel 12 proceeds forward. This process can be applied to tubes manufactured from a variety of materials, including, but not limited to, steel, aluminum, fiber reinforced plastic (FRP), polymers such as high density polyethylene, and concrete or other ceramics.

Although this concept may be used with both brittle materials and ductile materials, brittle materials, such as frangible aluminum, ceramics, or concrete, fragment during the process and produce shrapnel that could pose a hazard to nearby traffic or pedestrians. The use of ductile materials or brittle materials which are appropriately coated so as not to produce shrapnel-like fragments may be used. Ductile materials, such as steel, polymers, or FRP materials with longitudinal reinforcement, tear into a number of longitudinal strips that remain attached to the undeformed portions of the tubular energy absorber.

The amount and rate of energy dissipation can be controlled by varying the shape, size, thickness, and strength of the thin-wall tubing 14 and the number of tubes. The location and required force level of the rupture can be controlled by incorporating stress concentrators on the tubing, using holes 17, slots 18, notches, cuts, scores and strengtheners such as gussets 19, shown in FIGS. 3A and 4A, or on the mandrel 12, using raised edges 30 as shown in FIG. 2C, or varying the geometrical shape of the mandrel. Further stress concentrators may include the use of preferential material orientation such as fiber alignment in fiber reinforced plastics or cold rolling of metals to produce elongated grain boundaries.

Figure 2A:
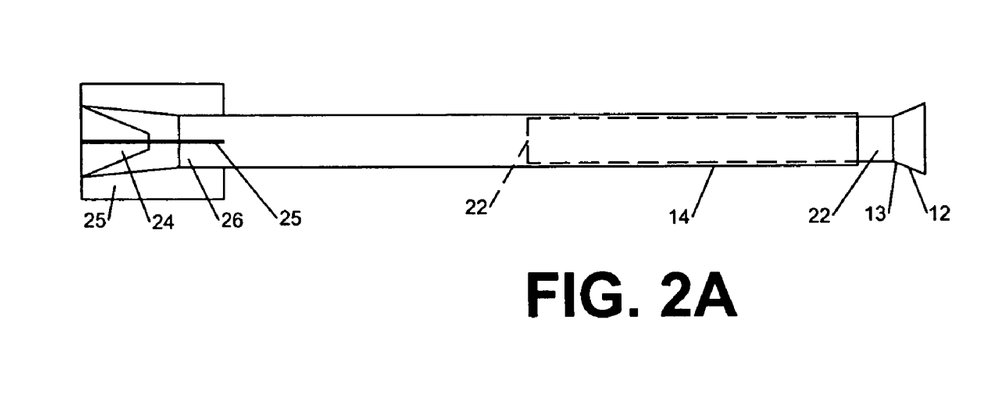
FIG. 2A is a side elevation view of an embodiment of an energy absorption component for use in the present invention having a mandrel with a forward tubular extension and a tubular member with a second mandrel.
Figure 2B:
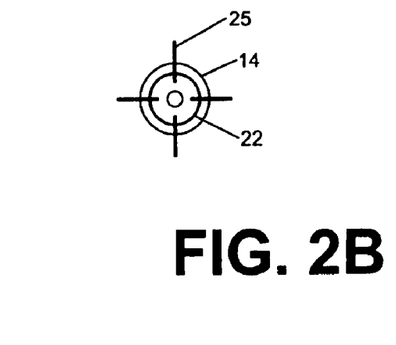
FIG. 2B is an end view of the illustration of FIG. 2A.
Figure 2C:
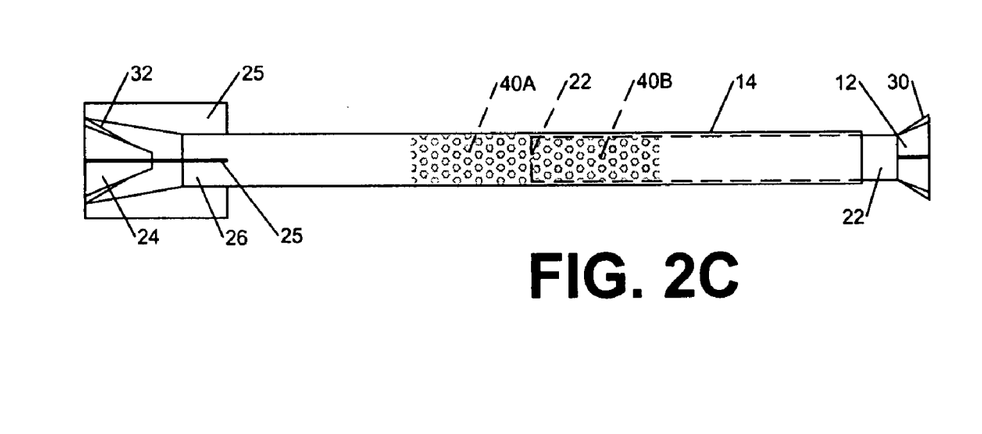
FIG. 2C is a side elevation view of an embodiment of an energy absorption component for use in the present invention with the first and second mandrels having stress concentrators.
Figure 2D:
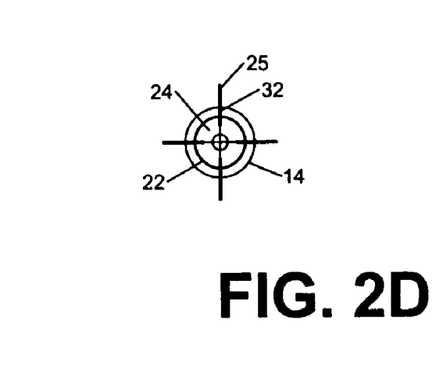
FIG. 2D is an end view of the illustration of FIG. 2C.

FIG. 2A shows a two-stage splitting system that involves splitting first one tube 14 and then another 22. The first tube 14 is attached to a roadside safety device (not shown). Initially upon impact of a vehicle with an impact head (not shown in FIG. 2A), the hollow tube extension 22 on mandrel 12 on the right is pushed into the outer tube 14. The mandrel 12 engages outer tube 14, causing it to split or rupture as illustrated in FIG. 1. After further displacement, the hollow tube extension 22 contacts a second, conical shaped mandrel 24 on the far end 26 of the outer tube 14 and is itself split. Each rupturing allows for controlled absorption of impact energy. Mandrel 24 is supported to outer tube 14 by gussets 25.

FIG. 2C illustrates a two stage system with gusset plates or raised edges 30 and 32 extending outward from the mandrels 12 and 24, respectively. These gusset plates 30 and 32 illustrate an example of a stress concentrator placed on the outer tube. The tubes may be provided with slots or strengthening members to control the rupturing process.

In addition, the controlled fracturing mechanism can be used in combination with other means of energy dissipation. Energy absorbing materials 40A and 40B (FIG. 2C) (e.g., aluminum honeycomb or composite tube, etc.) can also be placed inside of the tubes to increase the energy dissipation capacity as shown in FIG. 2C.

For end-on impacts, the vehicle will contact the impact plate 132 (FIGS. 6A, 6B, and 7), i.e., end of the impact head 104, and push it forward. This in turn will push the mandrel 12 (FIGS. 1A, 1B, 2A, 2C, 3B, 4A) or 12A (FIGS. 5A and 5B), or 138 (FIG. 7) forward into the thin-wall tubing and start the process of expanding and fracturing/bursting of the tubing. This process will continue until: (a) the impacting vehicle is brought to a safe and controlled stop; (b) the entire length of the tubing is fractured; or (c) the impacting vehicle yaws out and disengages from the impact head.

For impacts that are end-on at a large angle, the impacting vehicle will initiate the controlled fracturing/bursting process until the thin-wall tubing is bent out of the way or the mandrel disengages from the thin-wall tubing, and then gate behind the device. Similarly, the impacts on the side of the thin-wall tubing 14 near the end of the device cause the thin-wall tubing will be bent out of the way, allowing the vehicle to gate behind the device. Thus, when struck on the corner, either on the end or the side of the cushion, the energy absorbing mechanism begins to collapse longitudinally providing lateral resistance as it begins to bend out of the way.

For impacts into the side of the thin-wall tubing downstream of the beginning of length-of-need, the thin-wall tubing will act like a barrier and contain and redirect the impacting vehicle. An anchoring mechanism will be necessary to resist the tensile forces acting on the tubing to contain and redirect the vehicle. Note that this requirement of containment and redirection is applicable only for devices that have redirective capability, such as a terminal or a redirective crash cushion.

Figure 3A:
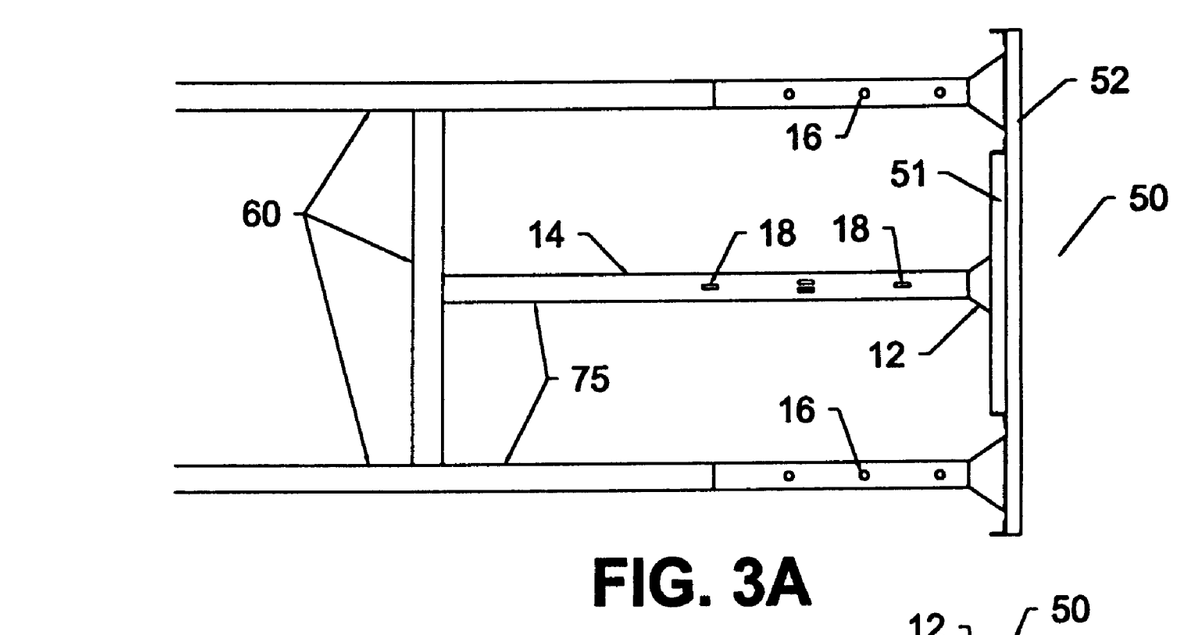
FIG. 3A shows a top plan view of controlled fracture energy absorbers attached to an impact head and trailer or truck mounted frame elements.
Figures 4A, 4B:
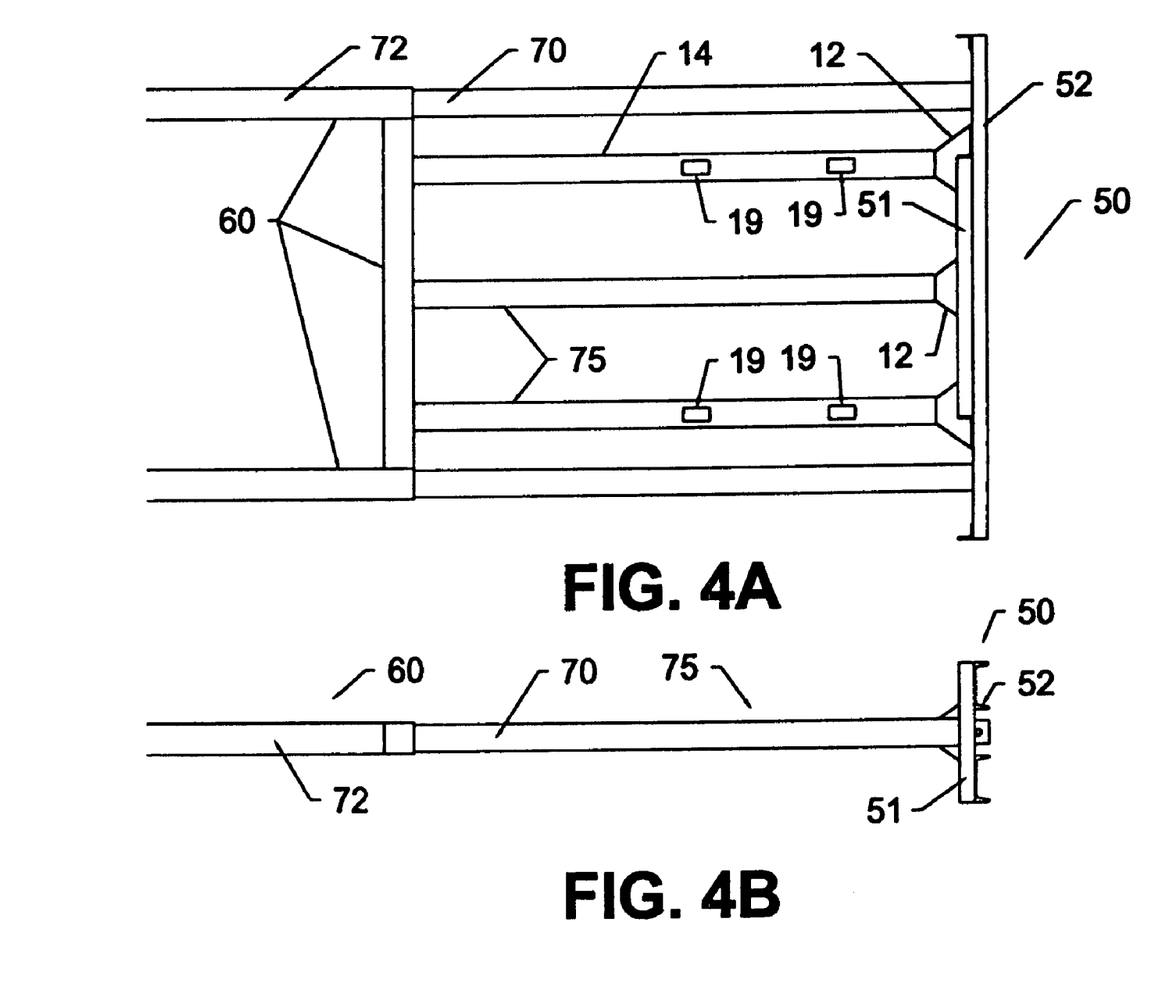
FIG. 4A shows a top plan view of an alignment member attached to the trailer or truck mounted frame.
FIG. 4B is a side elevation view of the illustration of FIG. 4A.

One particular roadside safety device utilizing the controlled fracture mechanism consists of a few major components, as illustrated in FIGS. 3A and 4A. Thin-wall tubing 14 is utilized. The tubing may have a circular, square, or rectangular cross-section. The edge of the front end of the tubing (i.e., the end into which the mandrel is attached) may have notches or slots to control the location(s) of the fracture for the tubing. The tubing may also have longitudinal slots cut along portions of its length to control the rate of energy dissipation.

Figure 3B:
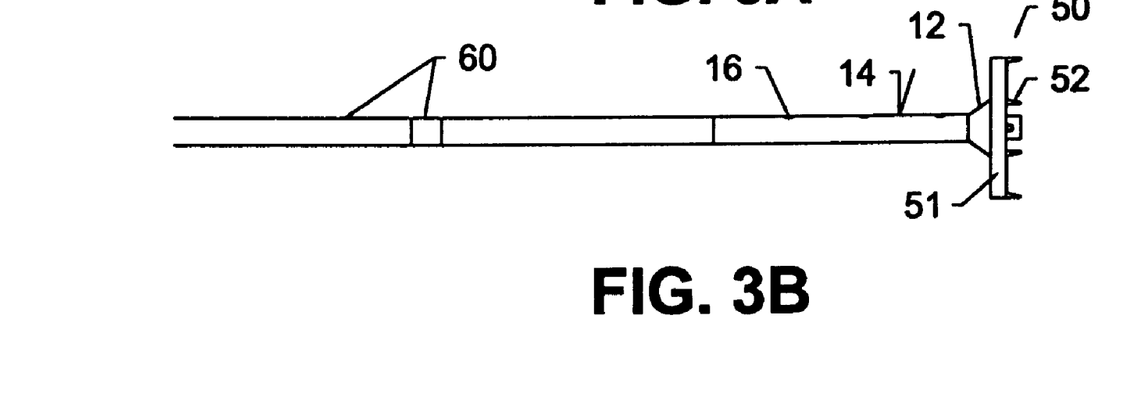
FIG. 3B is a side elevation view of the illustration of FIG. 3A.

An impact head/plate 50 is provided. Details of the impact head/plate are shown in FIGS. 3B and 4B. The impact head 50 consists of an impact plate 51; a means to provide mechanical interlock 52 between the impact head and the front of the impacting vehicle, such as raised edges around the impact plate 50; and a mandrel 12 welded to the back of the impact plate 50.

The mandrel 12 is much stronger (having a greater tensile strength, a greater thickness, or greater hardness) than the splitting tube 14 to prevent the mandrel from deforming. The mandrel 12 need not have the same cross-sectional shape as the thin-wall tubing, however, there must be only small clearances between the mandrel and the tubing in order to prevent misalignment. For example, channel or wide flange shapes could be used with rectangular frame rail elements as long as the height and depth of the open sections were close to the same as the clear opening in the tube.

The head 13 of the mandrel 12 is tapered so that only the leading portion of the mandrel head 13 initially will fit into the thin-wall tubing. The mandrel 12 may have stress concentrators, e.g., a particular geometrical shape or raised edges, to control where the thin-wall tubing will fracture. For square or rectangular tubes, the mandrel may have a corresponding square or rectangular shape that flares outward. This type of tube/mandrel combination, as discussed below in relation to FIGS. 5A and 5B, assures that the tube splits at the corners where strain hardening during manufacturing has made the metal less ductile.

As mentioned previously, the controlled fracture mechanism of the present invention may be used in combination with other forms of energy dissipation. One such design (FIG. 2C) may include the placement of some form of energy absorbing material 40A and 40B, such as aluminum honeycomb or composite tube inside the thin-wall tubing. As the mandrel proceeds forward, the mandrel will fracture the thin-wall tubing as well as crush or compress the energy absorbing material inside the tubing for additional energy absorption.

For example, a composite tube trailer or truck mounted attenuator may use a crushable composite beam as its primary energy dissipation mechanism. Two typical embodiments of this device are shown in FIGS. 3A and 4A. One embodiment, shown in FIG. 4A, uses telescoping frame rail elements 70 and 72 to maintain lateral stability and alignment for the attenuator and utilizes the controlled fracture concept with composite tubes to provide the energy dissipation. Frame 60 is mounted to the trailer or truck to support the head 50 and energy absorption mechanism 75. It is envisioned that cables or thin steel straps (not shown) may be used to brace the frame 60. Cables may be attached to the back of the frame on one side and to the front of the frame on the other side to prevent lateral "racking" of the frame system.

Another embodiment utilizes controlled fracture frame rail elements in addition to composite tube energy absorbers as shown in FIG. 3A. A given system may have additional energy absorbers placed inside of the telescoping tubes or outside.

As previously stated, the tube bursting energy absorber works on the principal that the energy associated with the propagation of cracks along the length of a tube can be carefully controlled and utilized to dissipate the energy of an impacting vehicle. This system incorporates a tapered mandrel that is forced inside an energy absorbing tube of slightly smaller dimensions. As the tapered mandrel is forced inside the tube, hoop stresses develop in the energy absorbing tube and these stresses are then used to propagate cracks along the length of the tube. The cracks propagate in front of the mandrel such that there is no direct contact between the mandrel and the crack surfaces, thereby limiting friction. The system's operation is somewhat different when incorporated for round and square energy absorbing tubes.

Although a number of energy absorbing systems utilized collapsing round tubes, none of the prior inventions have incorporated square tubes. The corners of square tubes make these energy absorbers perform much differently than round tubes. Because square tubes have rounded corners, a tapered square mandrel forced inside a square tube will tend to contact the tube only in the vicinity of the corners. Although such a system would eventually produce ruptures in the corners of the tube, the sharp corners of the mandrel would contact the crack surfaces and high friction forces would be generated.

Figure 5A:
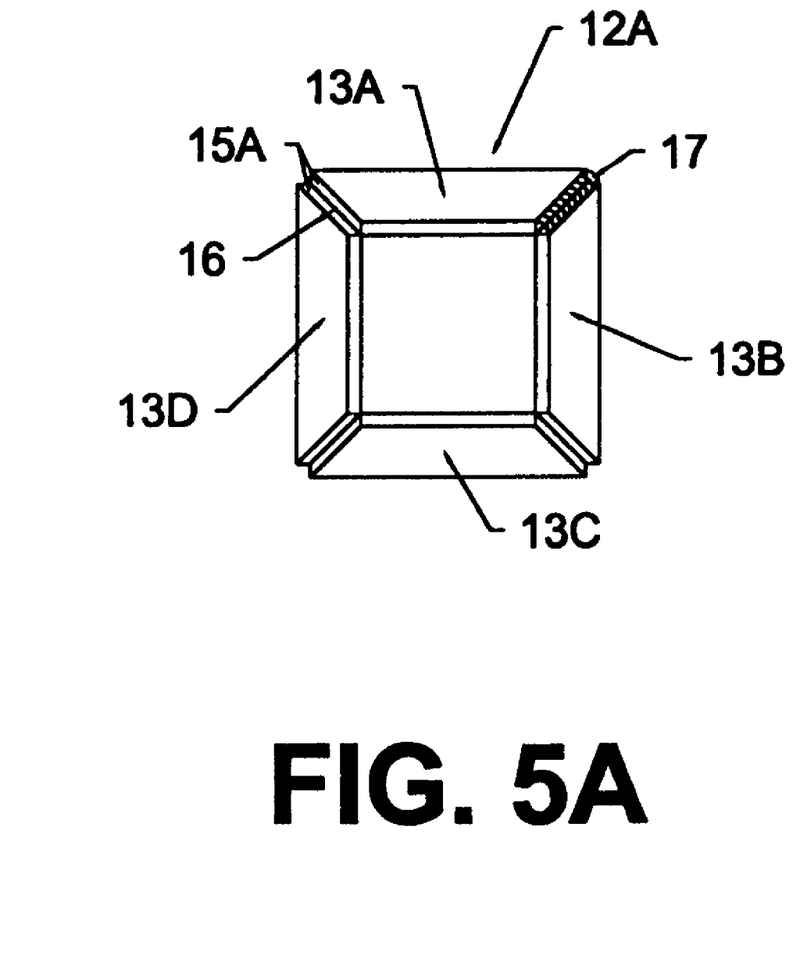
FIG. 5A illustrates a rectangular mandrel of an energy absorption component for use in the present invention.
Figure 5B:
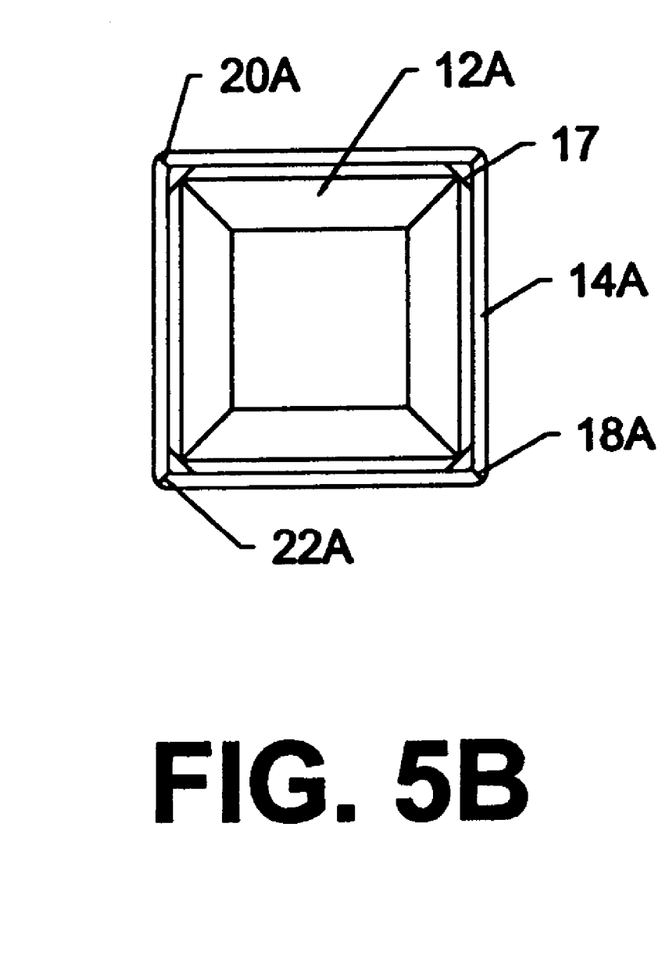
FIG. 5B shows the rectangular tubular member of an energy absorption component for use in the present invention.

A tube bursting energy absorber may avoid this situation by using a tapered mandrel with bevels at each corner. As shown in FIG. 5A, the preferred mandrel 12A for square tubes 14A (FIG. 5B) involves welding four steel plates (13a, 13b, 13c, and 13d) together to form a pyramid. The interior edges of the plates are placed together and the valley 16 is fillet welded to form a relatively flat, beveled surface 17 at each corner (only one corner is shown in FIG. 5A with the flat, beveled surface 17). As shown in FIG. 5B, this configuration allows the mandrel 12A to contact the square tube 14A everywhere but the rounded corners 18A. As the tube is pushed onto the mandrel, the rounded corners will be placed in tension and straightened out. As this happens, stress concentrations where the tube walls bend around the beveled edges of the mandrel will initiate cracks. These cracks will then propagate in front of the mandrel 12A to produce a controlled energy absorbing system. The mandrel will not contact the crack surfaces and therefore friction between the mandrel and the energy absorbing tube is minimized.

Because there are two crack initiators at each corner, two cracks can start and propagate simultaneously. Normally only one of these two cracks will dominate and the other crack will stop propagating. However, when this occurs, one side of the tube is actually a very shallow channel shape, which tends to dissipate more energy when the cracked walls are curled back. Saw cut manufactured cracks placed in the center of each corner can force the crack to run down the center of the tube corner. Thus, initial manufactured cracks can lower the energy dissipation associated with square tubes to some extent.

The energy dissipation rate for this system may be controlled by a number of factors, including the thickness of the energy absorbing tube, bevel angle on the mandrel, lubrication applied to the inside of the energy absorbing tube, and the material used in the energy absorber. Energy is dissipated by the tube bursting energy absorber through three primary mechanisms: crack propagation, curling of the cracked sections of tube, and friction. Crack propagation energy in a square or rectangular tube is controlled primarily by the type and thickness of the material used in the energy absorbing tube. More ductile and tougher metals have higher strain energy release rates and thus dissipate more energy. Likewise, thicker tubes also absorb more energy in the crack propagation process.

Energy dissipated as the cracked sections of a rectangular tube are curled back is controlled by the taper angle of the mandrel and the thickness of the material. Higher mandrel taper angles decrease the radius of the curled sections of cracked tube and thereby increase the energy dissipated in the bending process. However, lower taper angles do increase friction slightly, thereby offsetting the decreased bending energy to some extent. Tube thickness also affects the energy required to curl the cracked sections of the tube.

Friction is the other major source of energy dissipation. Lubricants placed inside the energy absorbing tube can greatly reduce friction energy. Although conventional lubricants such as grease or oil, and other hydrocarbon compositions, can serve this purpose, other lubricants could include zinc used in the galvanizing process, paints, ceramic composition surfaces, and even rust particles.

Round tubes made from ductile materials, such as low carbon steel, will deform greatly when a tapered mandrel is driven inside. If the energy absorber does not include weakening mechanisms as described by Smith (1975), the tube will expand sufficiently to completely engulf the mandrel. In this case, the forces required to push the mandrel inside the energy absorber rise rapidly and the system is ineffective. Smith teaches that, by using a pattern of slots in the energy absorbing tube, it can be made to deform outwardly away from the mandrel and fold back upon itself. In this situation the energy absorbing forces are controlled, but the cost of producing the large numbers of slots, holes, or other weakening mechanisms is high. As described above, a tube bursting energy absorber may involve propagating cracks along the length of the tube. For round tubes, these cracks must be manufactured in the end or along the side of the tube. The cracks are manufactured by placing small saw cuts at strategic points around the tube or by scoring the surface of the tube along its length. FIG. 5A shows a saw cut 20A in the center of one of the rounded corners. Optimally, saw cuts should be twice as long as the wall thickness of the energy absorbing tube. FIG. 5A shows a score 22A in the center of one of the rounded corners. Scores need only be 10–20% of the thickness of the energy absorbing tube in order to propagate the crack. Scoring refers to a shallow notch, cut, mark, or scratch down the side of the tubes. Typically, they look like little grooves down the sides of the four corners in the rectangular tube configuration. However, the scores could be placed any place along the tube to enhance or promote crack propagation and/or reduce the bursting force levels. Scores may be placed on the outside or inside of the tubes. When forced inside the energy absorbing tube, the mandrel creates high hoop stresses which will cause the cracks to grow in a opening mode.

There are two primary advantages of this system. The first advantage is that small saw cuts and/or shallow surface scores are very inexpensive to produce. The second advantage of this approach is that the cracks propagate in front of the mandrel in a manner to prevent direct contact between the mandrel and the crack tip. By keeping the mandrel out of the crack tip, friction is greatly reduced and the energy dissipation rate is controlled.

Just as in the case with the square tube, the energy dissipation rate of the absorber can be influenced by the thickness of the energy absorbing tube, bevel angle on the mandrel, lubrication applied to the inside of the energy absorbing tube, and the material used in the energy absorber. The primary difference in energy dissipation between round and square tubes is that round tubes can have a number of different crack configurations. The crack propagation energy is directly related to the number of cracks induced in the tube. The energy dissipated as the cracked sections of tube are curled back is controlled by the taper angle of the mandrel and the number of cracks induced in the tube. When more cracks are induced in the tubes, the moment of inertia of each cracked section is reduced. By reducing the section modulus, the energy required to bend each section back is reduced. Energy dissipation by round tubes is also controlled by all of the factors mentioned previously for the square tube.

For any given tube configuration, energy dissipation rates are relatively constant. However, for many safety applications it is desirable to design energy absorbers with multiple energy absorption stages. Another advantage of the tube bursting energy absorber is that multiple stages are easily implemented by nesting energy absorbing tubes of varying lengths. For example, a two-stage energy absorbing system can be set up by inserting a longer tube inside a shorter tube of larger dimension. The first stage would consist of a single tube while the second stage would consist of two nested tubes. When the mandrel reaches the nested tube, cracks will be propagated down both the inner and outer tubes and the energy dissipation increases to a higher level. The energy dissipation rate for the two combined tubes is generally less than the sum of the rate for each tube bursted separately. This decrease can be attributed to reduced friction associated with the combined bursting process.

Another means of developing a two-stage energy absorbing system is to score only the front portion of a tubular section. The scored section of the tube typically has a lower energy dissipation rate than the un-scored portion of the tube, thus forming a two-staged energy absorbing system.

A box-beam burster energy absorbing tube single-sided crash cushion 100 (shown in FIGS. 6A and 6B), herein referred to as BEAT-SSCC, uses bursting tube technology as described in detail above. The BEAT-SSCC is designed for use as a crash cushion in situations where it can be impacted only from one side. The BEAT-SSCC provides similar impact performance as other existing treatments, but at a considerably lower cost.

Figure 6A:
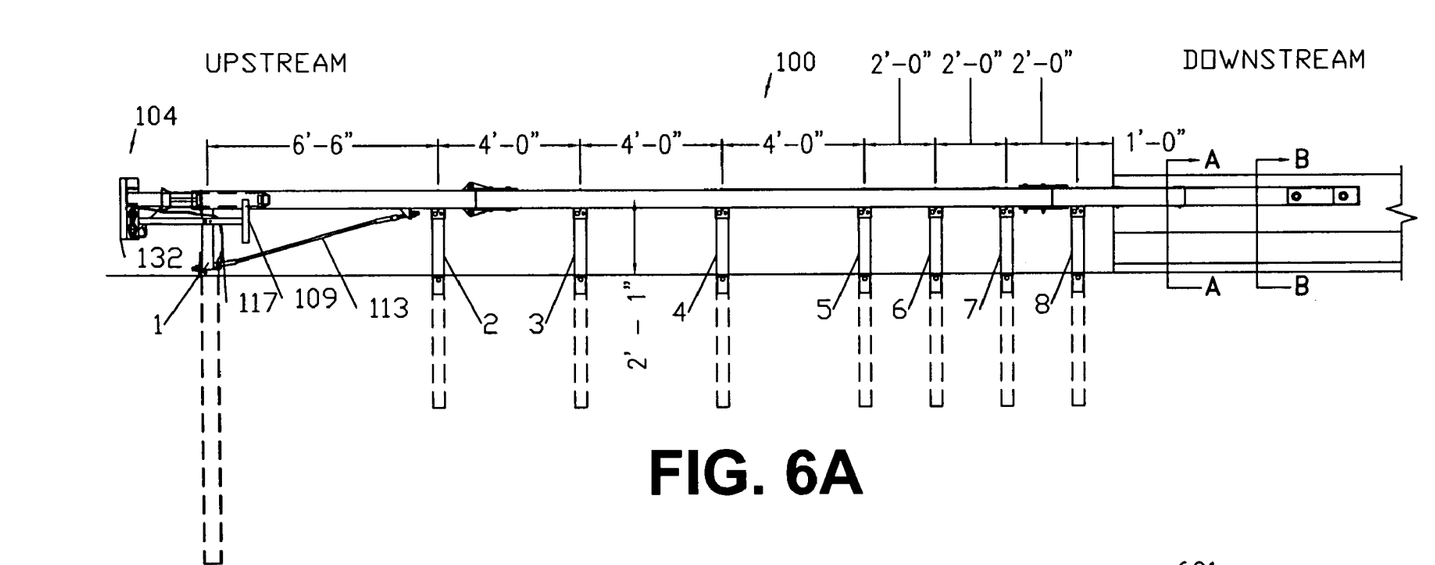
FIG. 6A is a side elevation view of a single-sided crash attenuation system of the present invention.
Figure 6B:
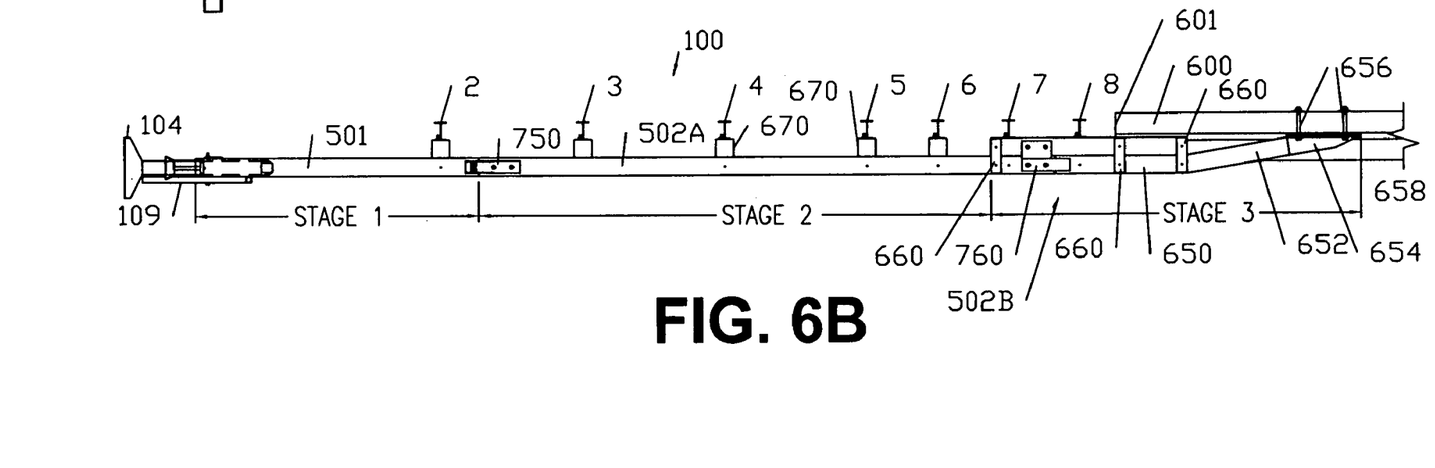
FIG. 6B is a top plan view of a single-sided crash attenuation system of the present invention.

The BEAT-SSCC described in FIGS. 6A and 6B has the following main features:

(a) a transition section for direct attachment of the crash cushion to the fixed-object hazard, e.g., end of concrete barrier, that the crash cushion in intended to shield; and (b) a third stage of energy absorption.

Turning to FIGS. 6A and 6B, it may be seen that the BEAT-SSCC has three stages of energy absorption instead of the two stages. The first two stages are stage one 501 and stage two 502A energy absorbing tubes. The third stage consists of a stage two energy absorbing tube 502B together with a box-beam blockout tube 504. The crash cushion 100 is designed so that the first two stages would have sufficient capacity to absorb the kinetic energy of a 2000-kg (4,409-lb.) pickup truck impacting at a nominal speed of 100 km/h (62.2 mph). The third stage energy absorption is intended as reserve capacity for impacts exceeding the design capacity of the crash cushion. The length of the stage two energy absorbing tube 502A may also be lengthened to increase the capacity of the crash cushion.

When the crash cushion is impacted end-on by an errant vehicle, the impact head 104 will engage and interlock mechanically with the front of the vehicle. As the vehicle proceeds forward, the impact head will be pushed forward along a box-beam rail element. The impact head will then contact a post breaker beam and break off the end steel breakaway post 1, thus releasing a cable anchorage.

Shortly after breaking the end 1 post, a tapered mandrel will contact the end of the stage one energy absorbing tube 501 and be forced inside the tube. As described above, cracks will then be initiated at the corners of the tube, the locations of which may be controlled by notches cut into the end of the tube. As the vehicle proceeds forward pushing the tapered mandrel into the tube, the cracks will continue to propagate in front of the mandrel until:

(a) the vehicle comes to a controlled and safe stop;

(b) the vehicle safely yaws away and loses contact with the tube/terminal; or (c) the entire length of the stage one energy absorbing tube is used up.

Upon complete bursting of the stage one energy absorbing tube 501, the process will repeat with the stage two energy absorbing tube 502A until:

(a) the vehicle comes to a controlled and safe stop;

(b) the vehicle safely yaws away and loses contact with the tube/terminal; or (c) the stage two energy absorbing tube is used up to the beginning of stage three.

Upon reaching the beginning of stage three, bursting of the energy absorbing tube will continue. In addition, a short section of box-beam, which serves as a blockout 504 to posts 7 and 8, and the rigid object (such as a concrete barrier 600) will be pushed forward. The downstream end of this box-beam section 504 will then be pushed into a tapered area between the outer box-beam rail element 652 and the face of the concrete barrier (or other rigid object). This deforms or compresses the downstream end of the box-beam section, which dissipates additional energy. Other methods of dissipating impact energy as the blockout tube is pushed forward are presented below.

For impacts into the side of the crash cushion downstream of the beginning of length-of-need, which is selected to be post 3 or 2.9 m (9 ft. 6 in.) from the end of the crash cushion, the crash cushion will contain and redirect the impacting vehicle. The cable attachment will provide the necessary anchorage to resist the tensile forces acting on the rail element to contain and redirect the vehicle.

Figure 7:
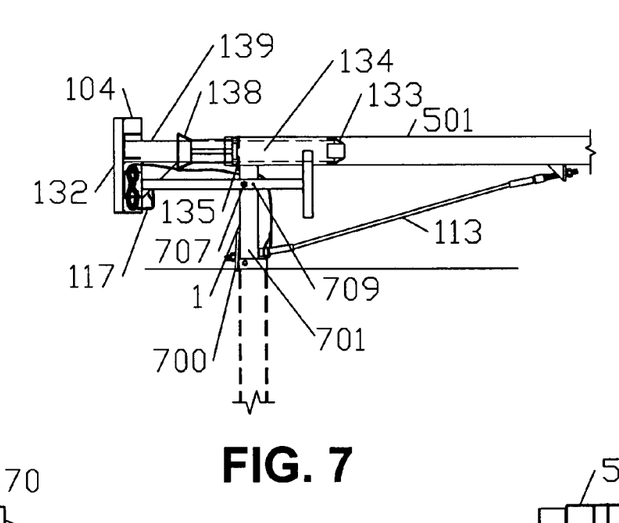
FIG. 7 illustrates a partial, side elevation view of the front end section of the single-sided crash attenuation system of the present invention.

The element of the BEAT-SSCC crash cushion 100, shown in FIGS. 6A, 6B and 7, is approximately 8.4 m (27 ft., 6 in.) in length from the nose of the impact head 104 to the beginning of the rigid object 601 (a concrete barrier 600 is shown in the drawing). The crash cushion may be installed tangent or with a 50:1 flare configuration to the travelway. The major components of the crash cushion 100 are as follows:

(a) an impact head assembly 104;

(b) a 2.4 m (8 ft.) long section of 152 mm×152 mm×3.2 mm (6 in,×6 in.×⅛ in.) box-beam rail for the stage one energy absorber 501;

(c) a 4.9 m (16 ft., 2½ in.) long section of 152 mm×152 mm×4.8 mm (6 in.×6 in.×3/16 in.) box-beam rail for the stage two energy absorber 502A;

(d) a fabricated third stage section 502B for attachment to the concrete barrier;

(e) a 1.7 m (5 ft., 6 in.) long section of 152 mm×152 mm×4.8 mm (6 in.×6 in.×3/16 in.) box-beam blockout rail 504;

(f) a steel breakaway end post 1;

(g) steel breakaway post for posts 2 through 8;

(h) a cable anchorage system 113;

(i) a post breaker 109 attached to the end post 1; and (j) a restraining cable 117.

The impact head assembly 104 consists of: a front impact plate 132, a mandrel tube 134 that inserts into the energy absorbing tube 501, and a tapered mandrel 138, details of which are shown in the drawing. The front impact plate 132 has a dimension of 510 mm×510 mm (20 in.×20 in.) with 50 mm (2 in.) wide protruded edges to provide a mechanical interlock with the impacting vehicle and to distribute the impact load. The mandrel tube is fabricated from a 1.2 m (46 in.) long section of 114 mm×114 mm×4.8 mm (4.5 in.×4.5 in.×3/16 in.) tube. The upstream end 139 of the mandrel tube is welded to the back of the impact plate 132. The downstream end of the mandrel tube is inserted into the stage one energy absorbing tube 501 for a distance of approximately 560 mm (22 in.). A tapered end 133 was formed on the downstream end of the mandrel tube 134 by welding 9.5 mm (3/8 in.) thick bent plates to the end, which act like a plunger to shear off bolts at connections to the posts and at splices. Two sets of 12.7 mm (1/2 in.) thick straps are welded around the mandrel tube to control the clearance of the mandrel tube within the energy absorbing tube, one set near the plunger end (i.e., where the mandrel tube is inserted into the energy absorbing tube) and the second set 135 approximately 560 mm (22 in.) upstream from the plunger end. The cross sectional dimension of the mandrel tube increases from 114 mm×114 mm (4.5 in.×4.5 in.) to a maximum of 168 mm×168 mm (6.6 in.×6.6 in.). The inside dimension of the energy absorbing tube is 146 mm×146 mm (5.75 in.×5.75 in.).

The stage one energy absorbing tube 501 is a 2.4 m (8 ft.) long section of 152 mm×152 mm×3.2 mm (6 in.×6 in.×1/8 in.) box-beam rail. A cable anchor bracket 700 for one end of the anchor cable 113 is welded to the bottom of the rail. The cable anchor bracket consists of a 12.7 mm (1/2 in.) thick plate with a 29-mm (1 1/8 in.) diameter hole for the cable anchor and reinforced with gussets. Two 63.5 mm×63.5 mm×6.4 mm (2.5 in.×2.5 in.×1/4 in.) angles are welded 50 mm (2 in.) upstream from the downstream end of the tube for connection to the standard box-beam rail section. Two special splice plates 750, details of which are shown in the drawing (FIG. 13), are used to connect the stage one and stage two box-beam energy absorbing tubes.

Figure 12A:
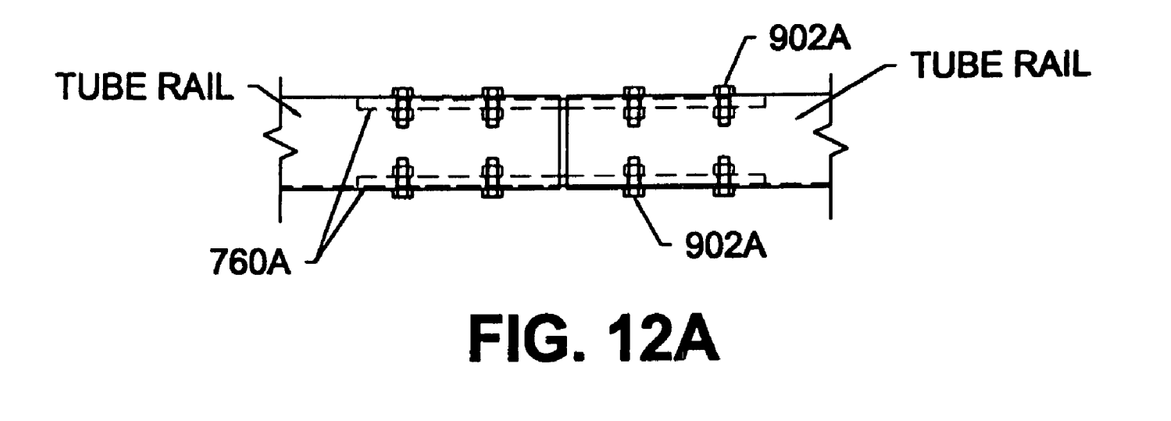
FIG. 12A is a cross-sectional, side elevation view of a standard splice mechanism for a box-beam guardrail.
Figure 12B:
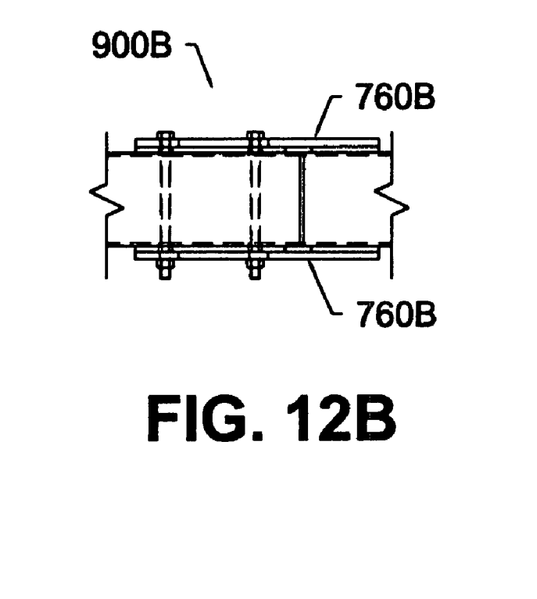
FIG. 12B is a cross-sectional, side elevation view of an alternative splice mechanism for use with BEAT applications.

The stage two energy absorbing tube 502A is a 4.9 m (16 ft., 2 1/2 in.) long section of 152 mm×152 mm×4.8 mm (6 in.×6 in.×3/16 in.) box-beam rail. A specially fabricated end section 502B is used to attach the rail elements to the concrete barrier 600. The end section consists of three subsections 650, 652, 654 welded together. The first two sections 650 and 652 are fabricated from 152 mm×152 mm×4.8 mm (6 in.×6 in.×3/16 in.) box-beam rails, one 1.1 mm (3 ft., 8 1/4 inc.) long and the other 0.9 m (2 ft., 11 1/8 in.) long. The end the first section 650 is welded to the beginning of the second section 652 at an angle of 81 degrees. An end shoe 654 is then welded to the end of the second rail section. The end shoe 654 is bolted to the concrete barrier with 254 mm (10 in.) long 25.4 mm (1 in.) diameter bolts with square washers and nuts. A spacer 658 is placed between the end shoe 654 and the face of the concrete barrier to account for the sloping face of the concrete barrier. The end section 502B is connected to the stage two energy absorbing tube 502A with two other splice plates 760A and 760B, details of which are shown in the drawings (FIGS. 12A and 12B).

The stage two energy absorbing tube 502A and the first section 650 of the end section are blocked out from posts 7 and 8 and the concrete barrier 600 with a 1.7 m (5 ft., 6 in.) long 152 mm×152 mm×4.8 mm (6 in.×6 in.×3/16 in.) box-beam rail. This blockout tube 504 is attached to the stage two energy absorbing tube 502B and the first section 650 of the end section with three sets of 290 mm×89 mm (11 1/2 in.×3 1/2 in.) 6.4 mm (1/4 in.) thick straps 660 and 7.9 mm (5/16 in.) diameter bolts, one at each end of the blockout tube and one at the end of the concrete barrier.

The blockout tube 504, together with the stage two box-beam rail 502A, provides a stage three energy absorber 502B. First, energy is dissipated by bursting the box-beam tubular section, similar to the stage two energy absorber. Second, energy is dissipated via the following means as the blockout tube is pushed forward:

(a) deformation of the blockout tube as it is squeezed between the tapered area of the end section and the concrete barrier;

(b) tearing of the walls of the blockout tube by the bolts that pass through the blockout tube;

(c) friction between the blockout tube and the adjacent barrier.

This stage three energy absorber ends when the mandrel reaches the end of the first section of the end section and/or when the blockout tube can no longer be pushed forward or deformed.

Figure 10:
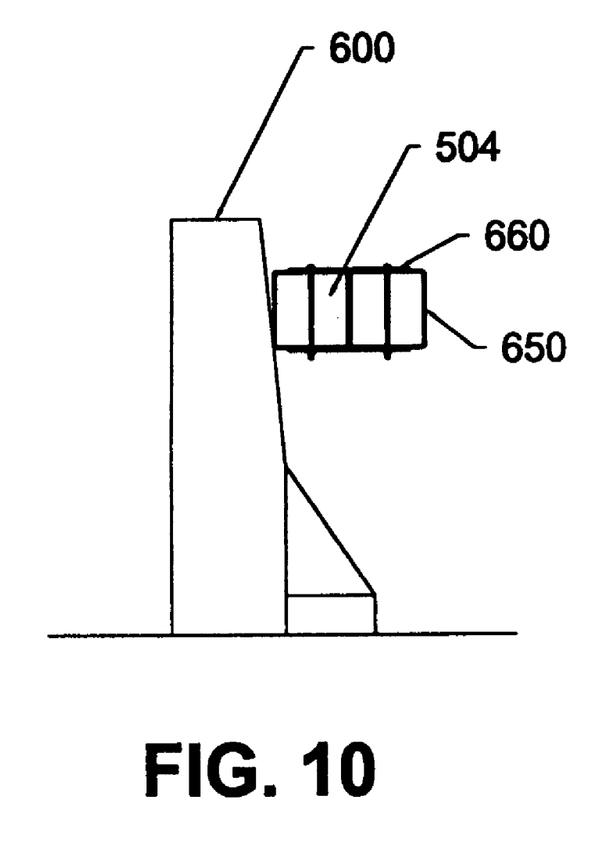
FIG. 10 is a cross-sectional view taken along line A—A of FIG. 6A.
Figure 11:
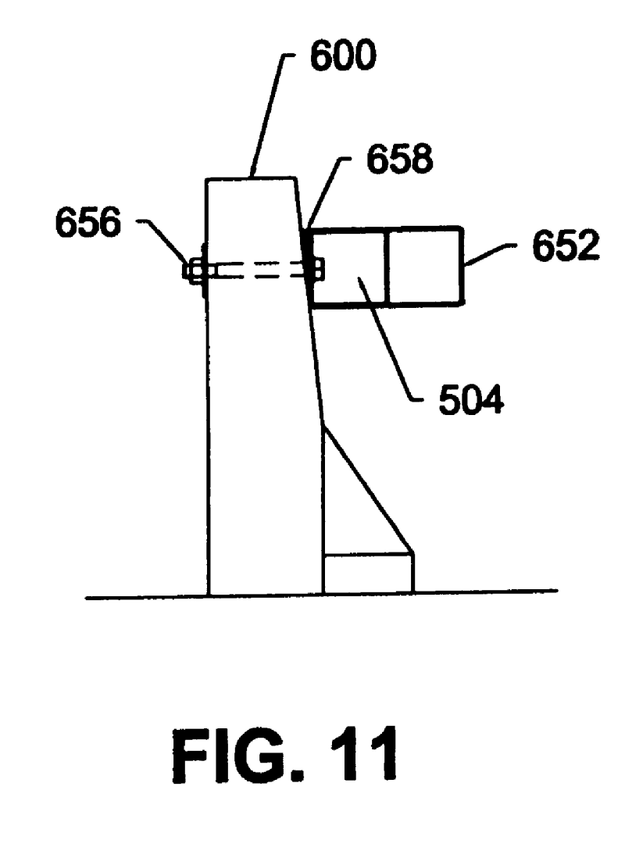
FIG. 11 is a cross-sectional view taken along line B—B of FIG. 6A.

FIGS. 10 and 11 illustrate the connections of the third stage with the barrier 600. FIG. 10 is a cross-sectional view along line A—A of FIG. 6. FIG. 11 is a cross-sectional view along line B—B of FIG. 6.

The steel breakaway end post 1 consists of an upper section and a lower section. The section is a 546 mm (21 1/2 in.) long section of standard W 150×13 (W6×9) steel post used with W-beam guardrail systems. The lower section is a 2.4 m (8 ft.) long section of standard W150×13 (W6×25) steel post with a 100 mm (4 in.) wide U-shaped collar welded to the top of the post. The upper post section is bolted to the collar of the lower post using a 10 mm (5/8 in.) diameter Grade 5 bolt. A 32 mm (1 1/4 in.) wide, 64 mm (2.5 in.) long slot is cut through the web of the upper post section at the bottom to allow attachment of one end of the cable anchor. The box-beam rail 501 is attached to the end post 1 using a special angle support bracket with 7.9 mm (5/16 in.) diameter A307 bolts.

Figure 8:
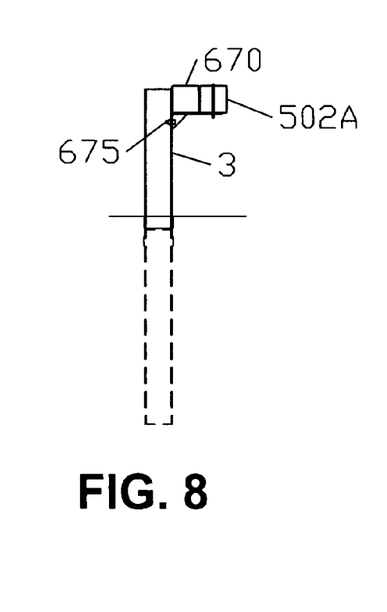
FIG. 8 is a cross-sectional, side elevation view of posts 2 through 6 of the system of the present invention.
Figure 9:
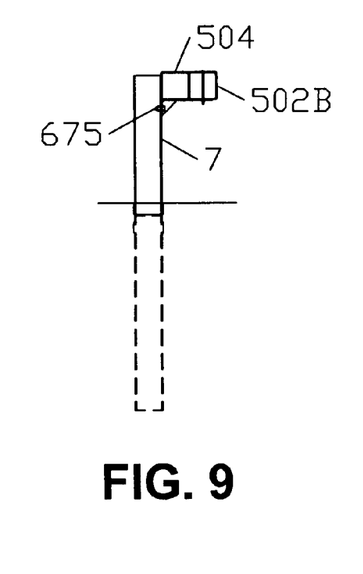
FIG. 9 shows a cross-sectional, side elevation view of posts 7 and 8 of the system of the present invention.

Posts 2 through 8 are standard 1.8 m (6 ft.) long breakaway steel posts. For posts 2 through 6 (FIG. 8), the rail element is attached to special support brackets 670 with 7.9 mm (5/16 in.) diameter bolts. The support bracket 670 is fabricated from 4.8 mm (3/16 in.) thick bent plate and reinforced with gusset plates. 127 mm (6 ft.) long 152 mm×152 mm×4.8 mm (6 in. ×6 in.×3/16 in.) box-beam rail sections are welded to the support brackets to serve as blockouts to the posts. The support brackets are in turn attached to the posts with a 10 mm (5/8 in.) diameter bolt 675. For posts 7 and 8 (FIG. 9) the support brackets do not have the welded tubular sections since there is already a blockout tube 504. The post spacing between posts 1 and 2 is 1.98 m (6 ft., 6 in.). The post spacing from post 2 to post 5 is 1.22 m (4 ft.) and the post spacing from post 5 to post 8 is 610 mm (2 ft.). The spacing from post 8 to the end of the concrete barrier is 305 mm (1 ft.).

A cable anchor assembly 113 (FIG. 7) is used to transmit the force from the box-beam rail element 501 to the end post 1. The cable is anchored to the end post 1 through a hole in the base of the upper section 701 of the end post 1 and attached with a cable anchor bearing plate, washer and nut. The other end of the cable is attached to the cable anchor bracket on the bottom of the box-beam rail with washer and nut. Unlike some energy absorbing terminals, there is no need for a mechanism to release the cable anchor assembly 113 from the rail since the rail 501 is bursted into four strips.

A post-breaker 109 (FIG. 7) is fabricated from 50 mm×50 mm×6.4 mm (2 in.×2 in.×¼ in.) tubes. The post-breaker is attached to the end post 1 using a 19 mm (¾ in.) diameter Grade 5 bolt 707. A second 6.4 mm (¼ in.) diameter bolt 709 is also used to keep the post-breaker from rotating. The post breaker is designed to facilitate the separation of the upper section from the lower section of the end post by either shearing of the attachment bolt or tearing of the metal above the attachment bolt in the collar. The post-breaker is designed to function for both head-on impacts as well as reverse direction impacts into the side of the terminal. In head-on impacts, the impacting vehicle would push the impact head into the upstream end of the post-breaker. For side impacts into the terminal in the reverse direction, the impacting vehicle would directly contact the post-breaker at its downstream end.

A 6.1 m (20 ft.) long, 6.4 mm (¼ in.) diameter, steel cable 117 is used to retain the impact head in case of a reverse direction impact, similar to the impact conditions under NCHRP test designation 3.39. One end of the cable is attached to the impact head and the other end of the cable is attached to the upstream end of the anchor cable at the end post. The cable is bundled and tied to the impact head to eliminate dangling of the cable.

A front portion from the nose or impact head 104 to post 5, of the BEAT-SSCC is similar to other terminals and crash cushions based on the BEAT technology. The unique features of the BEAT-SSCC from post 5 to the end of the assembly include:

(a) Reduced post spacing of 610 mm (2 ft.) from post 5 through post 8 and 305 mm (1 ft.) from post 8 to the end of the concrete barrier (or fixed object) to stiffen the system so as to minimize the potential for the impacting vehicle to snag on the end of the concrete barrier (or fixed object).

(b) The stage two energy absorbing tube and the first section of the end section are blocked out from posts 7 and 8 and the concrete barrier (or fixed object) with a 1.7 m (5 ft., 6 in.) long 152 mm×152 mm×4.8 mm (6 in.×6 in.×³⁄₁₆ in.) box-beam rail. This blockout tube also stiffens the system so as to minimize the potential for the impacting vehicle to snag on the end of the concrete barrier (or fixed object).

(c) The blockout tube, together with the box-beam rail, provides a stage three energy absorber. First, energy is dissipated by bursting the box-beam tubular section, similar to the stage two energy absorber. Second, energy is dissipated via the following means as the blockout tube is pushed forward:

1. Deformation of the blockout tube as it is squeezed between the tapered area of the end section and the concrete barrier;
2. Tearing of the walls of the blockout tube by the bolts that pass through the blockout tube;
3. Friction between the blockout tube and the adjacent barrier produced by bolts placed in slotted holes. The bolts could provide a predetermined clamping force which would produce as associated friction force. The slotted holes would allow the clamping force to remain for a specified slip distance. The ends of the slots could be staggered to allow the friction force to be stepped down as forces crushing the end of the blockout tube begin to rise.

(d) The end section is attached to the concrete barrier (or fixed object) using a specially designed end shoe to minimize the potential for an impacting vehicle snag on the end of the end section when impacted in the reverse direction.

As previously stated, improved splice mechanisms for box-beam guardrails and terminals were developed and successfully crash tested. These splice mechanisms are intended for use with the box-beam Burster Energy Absorbing Terminal (BEAT) applications, but may also be used for any box-beam barrier systems and terminals.

FIG. 12A shows a standard splice mechanism 900A for a box-beam guardrail. The splice mechanism consists of two splice plates 760A bolted to the inside of the top and bottom of the box-beam rail. In order for the bursting process to continue through a splice, it is necessary to shear off the splice bolts 902A and release the splice plates in advance of the mandrel. The energy and the associated force level required to shear off all eight (8) splice bolts simultaneously may be too high for this design to be a commercially viable alternative. FIG. 12B illustrates an alternative mechanism 900B wherein the splice plates 760B are bolted on the outside.

Figure 13:
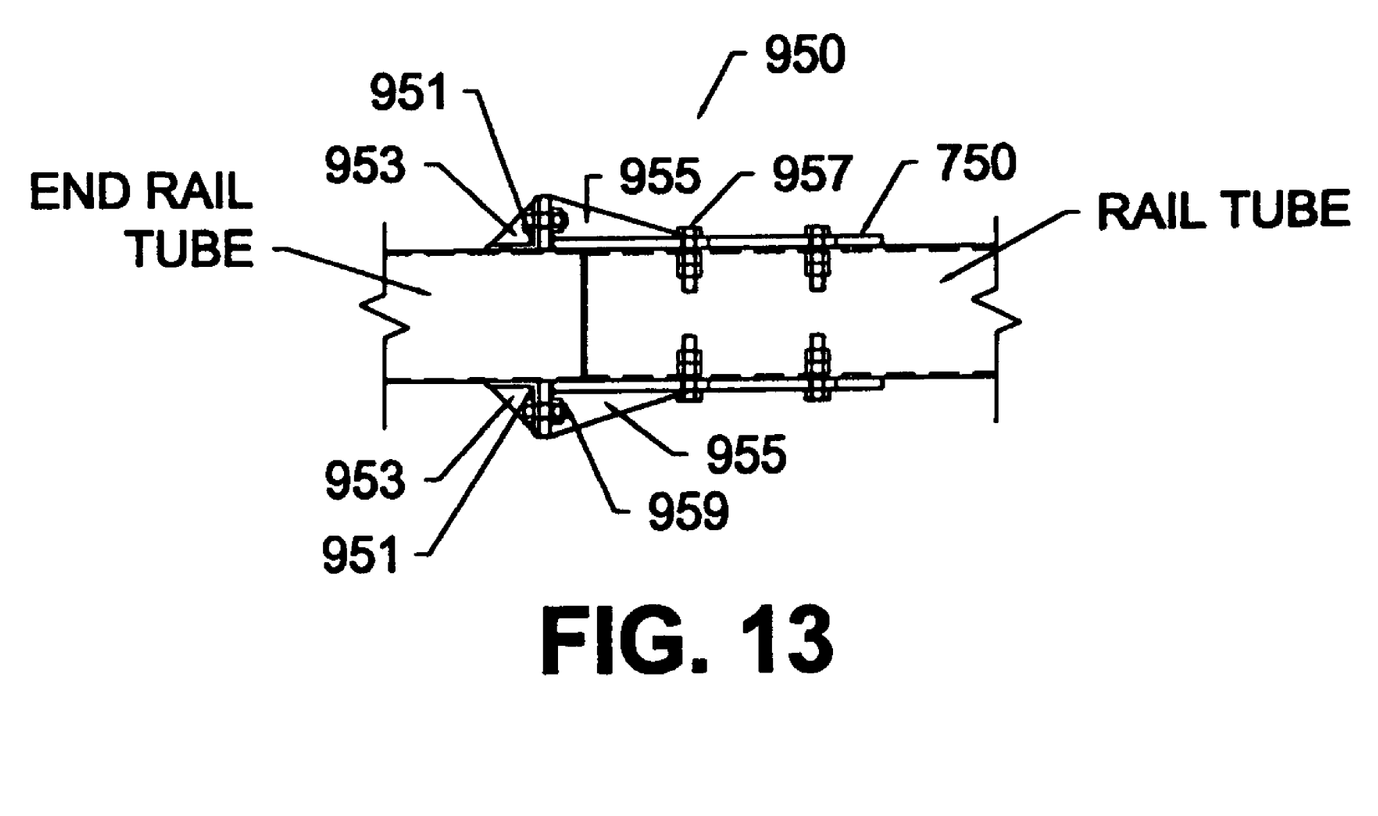
FIG. 13 is a cross-sectional, side elevation view of the second splice of the present invention.

FIG. 13 shows an alternative splice mechanism designed for use with BEAT applications. Splice mechanism 950 consists of two angles 951 welded 50 mm (2 in.) from the downstream end of the upstream tube, one on top and one on the bottom. The angles are 63.5×63.5×6.4 mm (2.5×2.5×¼ in.) in dimension and reinforced with gusset plates 953. Two special splice plates 750, details of which are shown in FIG. 13, are used to connect the upstream tube to the downstream tube. The splice plates are fabricated from 13 mm (½ in.) A36 steel plates and welded together to form a L-shaped and reinforced with gusset plates 955. The overall dimensions of the splice plates are 406 mm (16 in.) long, 102 mm (4 in.) wide, and 63.5 mm (2.5 in.) high. The longer legs of the splice plates are bolted to the upstream end of the downstream tube with two 16 mm (⅝ in.) diameter Grade 5 bolts 957 each, again one on top and one on the bottom. The shorter legs of the splice plates on the upstream end are then bolted to the angles on the upstream tube, also with 16 mm (⅝ in.) diameter Grade 5 bolts 959.

This splice mechanism 950 requires the mandrel to shear off only two bolts at one time, thus greatly reducing the energy and associated force level. Also, the splice plates 750 are outside of the tubes and do not interfere with the mandrel. This splice mechanism 950 was crash tested and shown to perform satisfactorily, meeting all evaluation criteria set forth in NCHRP Report 350 guidelines. The moment capacity of this splice mechanism seems limited by the bolts connecting the splice plates to the angles, rendering the BEAT terminal design more sensitive to redirectional type of impacts.

Figure 14A:
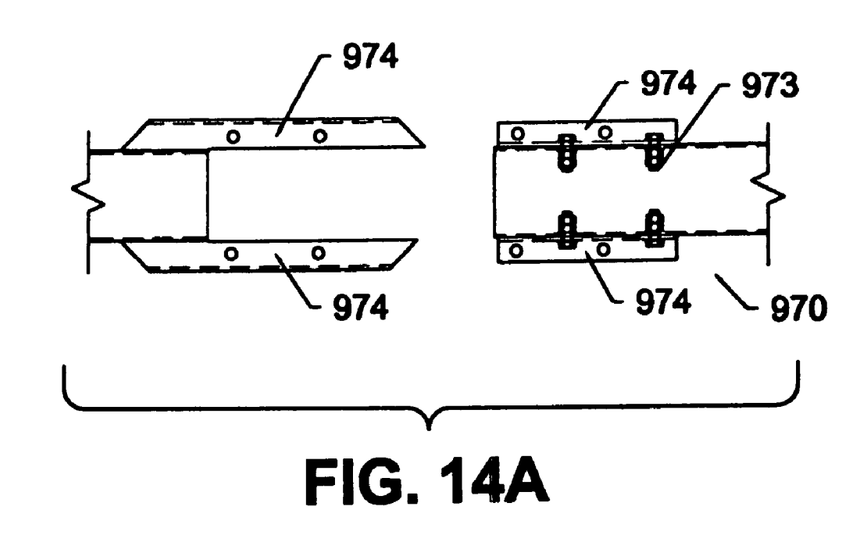
FIG. 14A illustrates an improved splice mechanism showing the rails separated.
Figure 14B:
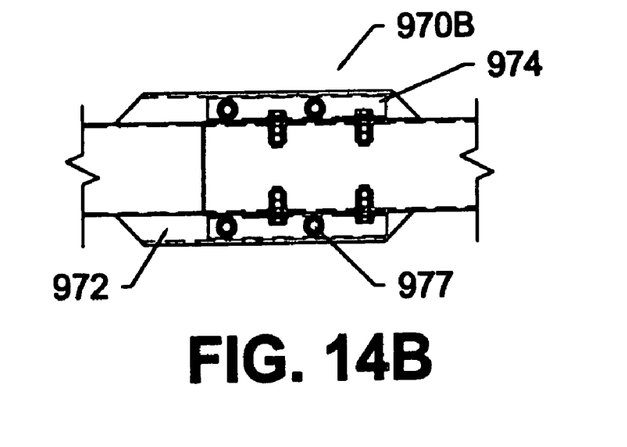
FIG. 14B illustrates the mechanism of FIG. 14 spliced together.

FIGS. 14A and 14B show details of an improved splice mechanism 970. The splice mechanism is consisted of two major components:

(a) two bent plate channels 972 welded to the downstream end of the upstream (first) rail element; and (b) two channel splice plates 974 bolted to the upstream end of the downstream (second) rail element.

The bent plate channels 972 are 517 mm (20⅜ in.) long and 121 mm (4¾ in.) wide, fabricated from 6 mm (¼ in.) thick plates. The height of the channels increases from 48 mm (1⅞ in.) on the downstream (free) end to 51 mm (2 in.) on the upstream (welded) end to provide more clearance for the channel splice plates to slide into place. The channels are welded to the top and bottom of the downstream end of the upstream tube for a length of 152 mm (6 in.). Both ends of the channels are tapered to minimize the potential for snagging by the vehicle.

The channel splice plates 974 are 267 mm (10½ in.) long and fabricated from C102×8 mm (4×⁵⁄₁₆ in.) channels. The channel splice plates are bolted to the top and bottom of the upstream end of the downstream (second) rail element with two 16 mm (⅝ in.) diameter Grade 5 bolts 973 each. As seen in FIG. 14B, the two rail elements are then mated together by sliding the ends of the rail elements together and bolting the channel splice plates 974 to the bent plate channel 972 with 19 mm (¾ in.) diameter Grade 5 bolts 977.

The improved splice mechanism 970 maintains the advantages of the initial design 950, namely, requiring the mandrel to shear off only two bolts at one time, thus greatly reducing the energy and associated force level; and keeping the splice plates outside of the tubes so that they do not interfere with the mandrel. In addition, the improved design 950 provides much greater moment capacity to the splice mechanism, thus improving the performance of the barrier system for redirectional types of impacts.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A single-side crash cushion system for attachment at a first end section to a plurality of guardrail posts and at a second end section to a fixed-object hazard, said system comprising:
   an impact head; and
   a multistage energy absorption mechanism attached to said impact head, said multistage energy absorption mechanism comprising:
      a first stage box-beam rail energy absorber attached at a first end to said impact head;
      a downstream, second stage box-beam rail energy absorber spliced at a first upstream end to said first stage box-beam rail energy absorber, said first and second stage box-beam rail absorbers being said first end section for attachment to said plurality of guardrail posts;
      a downstream, third stage box-beam rail energy absorber comprising:
         a first box-beam rail section attached to and extending generally parallel to and along one side of a blockout tube, said first box-beam rail section spliced at a first end to a second downstream end of said second stage box-beam rail energy absorber, said blockout tube attached at an upstream end to at least one of said plurality of guardrail posts and attached at a downstream end to said first box-beam rail section between said fixed-object hazard and said first box-beam section, said third stage box-beam rail energy absorber being said second end section for attachment to said fixed-object hazard.

2. The system of claim 1 wherein said second stage box-beam rail energy absorber is directly spliced to said first stage box-beam rail energy absorber and said first box-beam rail section is directly spliced to said second downstream end of said second stage box-beam rail energy absorber.

3. The system of claim 1 wherein said first box-beam section further comprises a first box-beam member; a second box-beam member; and an end shoe member, said first box-beam member attached on a downstream end to said second box-beam member at an acute angle diverting said second box-beam member inwardly toward said fixed-object hazard, said end shoe member attached on a downstream end of said second box-beam member, said end shoe member attached directly to an outer surface of said fixed-object hazard, said downstream end of said blockout tube adapted to compress between said fixed-object hazard and said second box-beam member upon impact to said impact head.

4. The system of claim 1 wherein
   said first stage box-beam rail energy absorber has a first wall thickness having a first level of kinetic energy dissipation,
   said second stage box-beam rail energy absorber has a second wall thickness having a second level of kinetic energy dissipation, and
   said third stage box-beam rail energy absorber has a third level of kinetic energy dissipation,
   said second wall thickness greater than said first wall thickness.

5. The system of claim 1 wherein said energy absorption mechanism further comprises:
   a first mandrel having a first tensile strength;
   a tubular member having a second tensile strength, said first mandrel receivable within a first end of said tubular member such that upon impact forces being applied to said impact head, said first mandrel is urged through said tubular member rupturing said tubular member thereby absorbing said impact forces;
   means for selectively controlling said rupturing along a length of said tubular member.

* * * * *